W. SWEET.
GEARING FOR WASHING MACHINES.
APPLICATION FILED NOV. 2, 1907.
906,334.
Patented Dec. 8, 1908.
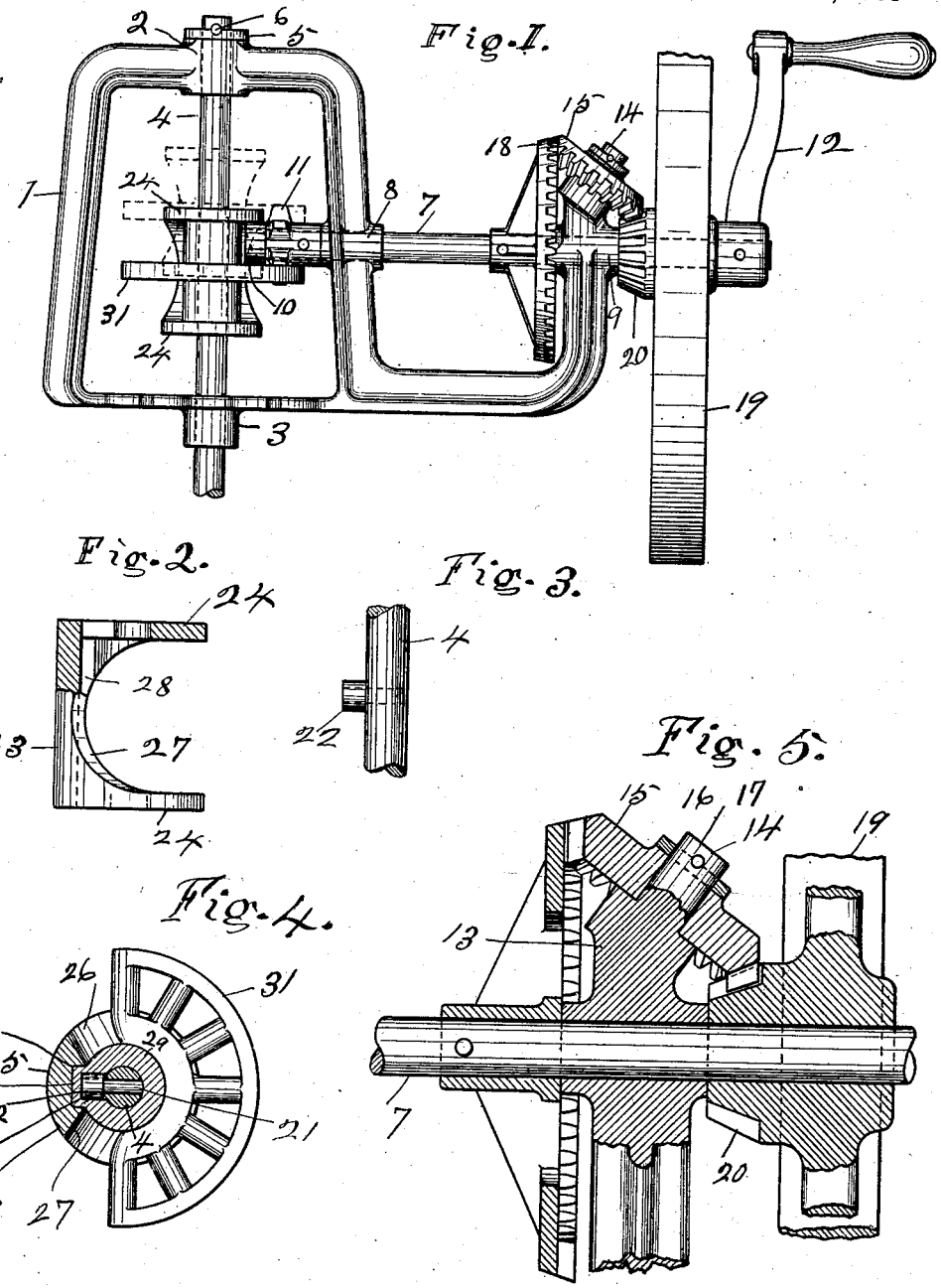
WITNESSES:
Augusta Viberg.
Auguste Spiegel.
Warren Sweet INVENTOR
BY Chapin & Denny
ATTORNEYS

UNITED STATES PATENT OFFICE.

WARREN SWEET, OF FORT WAYNE, INDIANA, ASSIGNOR TO GEORGE V. BLACKSTONE, OF JAMESTOWN, NEW YORK.

GEARING FOR WASHING-MACHINES.

No. 906,334.      Specification of Letters Patent.      Patented Dec. 8, 1908.

Application filed November 2, 1907. Serial No. 400,340.

*To all whom it may concern:*

Be it known that I, WARREN SWEET, a citizen of the United States, residing at Fort Wayne, in the county of Allen, in the State of Indiana, have invented certain new and useful Improvements in Gearing for Washing-Machines; and I do hereby declare that the following is a full, clear, and exact description of the invention, which will enable others skilled in the art to which it appertains to make and use the same, reference being had to the accompanying drawings, which form part of this specification.

My invention relates to improvements in gearing for washing machines, and is specially designed and adapted for employment in that type of washing machines in which an alternate reversal of the agitator shaft is required.

The prime object of my present invention is to provide mechanism for operating washing machines of the rotary type, of comparatively simple, reliable and efficient construction, in which the balance wheel is given a greater speed than the power-shaft, thereby imparting to the balance wheel sufficient momentum in use to materially lessen the labor of actuating the power-shaft and its driven connections, and to aid in overcoming any unusual strain or obstruction to the movements of the agitator shaft, as in the momentary bunching of the clothes in the tub and the like.

Another object of my invention is to provide an improved means for transforming the continuous rotary motion of the power shaft into an alternating motion of the driven or agitator shaft.

My invention consists of a driving shaft and a driven shaft rotatably mounted in suitable bearings and in right-angular relation in a suitable upright supporting frame; a two-part non-rotatable cylinder slidably mounted on the driven-shaft and provided with a fixed semi-circular rack; a rigid pinion on the driving shaft adapted for a meshing engagement with the said rack; a driving crank on the outer end of the driving shaft; a balance wheel loosely mounted on the driving shaft adjacent to the said crank, and provided upon the inner end of its hub with a fixed or integral beveled gear-wheel; an oblique stud-shaft integral with the said supporting frame; a beveled gear-wheel rotatively mounted on the said stud-shaft in mesh with the said hub gear; and an upright gear-wheel fixed on the driving shaft in gear with the said bevel gear, whereby the balance wheel is adapted to make three and one-third revolutions to every revolution of the driving-shaft and in an opposite direction.

The principal novel features of my invention are the means for reversing the rotation of the agitator-shaft and the means for imparting to the balance wheel a speed of rotation three and one-half times as great as that of the driving-shaft.

Similar reference numerals indicate like parts throughout the several views of the drawings in which Figure 1 is a side elevation of my invention in position in a supporting frame with the balance wheel broken partly away, and showing in dotted outline the upper limit of the sliding cylinder, the driven vertical shaft being broken away at its lower end. Fig. 2 is an enlarged detail of a portion of the two-part sliding cylinder rack through the medium of which the alternate reversal of the driven shaft is secured, the said portion being partly broken away to show the arrangement of the longitudinal slot therein. Fig. 3 is a fragmentary detail of the central portion of the driven shaft showing the arrangement of the anti-friction roller thereon. Fig. 4 is a cross-section of the sliding cylinder rack showing the means for maintaining the coacting parts in their interlocked engagement. Fig. 5 is an enlarged fragmentary view in vertical section of the balance wheel and the means for actuating the same.

The upright supporting frame 1, of common form has suitable vertically alined bearings at 2 and 3 for the driven shaft 4, which is known as the agitator-shaft, is supported against downward displacement by the loose collar 5 and the fixed pin 6 which passes through the upper end of the shaft.

The driven or power shaft 7 is loosely mounted in the suitable bearings at 8 and 9 as usual, and has its inner end provided with an antifriction roller 10 and a fixed pinion 11, and has its extended outer end provided with a fixed actuating crank 12.

The frame 1 is provided at one end thereof with an upright lug 13, Fig. 5, having an oblique stud-shaft 14 on which is loosely mounted a bevel-gear wheel 15 secured in position thereon by means of a collar 16 and a pin 17. A gear wheel 18 of proper dimensions is fixed on the driving shaft 7 in a suitable position to form an actuating engagement with the gear-wheel 15. Adjacent to the inner face of the crank 12 is loosely mounted a balance-wheel 19 having a fixed or integral bevel gear 20 upon the inner end of the hub adapted for a meshing engagement with the bevel gear wheel 15. The driven shaft 4 is provided at a suitable point with a fixed pin 21 whose outer extended end has a loose antifriction roller 22 for the purpose about to be described.

The means for alternately reversing the driven shaft consists of a casting 23 comprising two centrally apertured circular heads 24, having a peripheral segmental connecting strip 25 whose oppositely beveled edges 26 and 27 form track-ways for the roller 10. The segmental connection 25 is provided upon its inner face with a central longitudinal slot 28 whose opposite ends are connected with the said circular apertures of the heads 24.

A second casting adapted for an interlocking connection with the above described casting, comprises a cylinder 29 having a central bore of the same diameter as the apertures in the heads 24. This cylinder 29 has a rectangular peripheral ledge or flange 30 throughout its length adapted to snugly fit the slot 28 in the casting 23, and is also provided with an angular recess 32 throughout its length adapted to snugly but loosely receive the roller 22, thereby preventing any rotary movement of the said rack on the driving-shaft. This cylinder 29 is provided midway of its ends with a fixed or integral semi-circular rack 31 adapted for an actuating engagement with the pinion 11.

The operation and manner of employing my invention thus described is obvious and briefly described is as follows: Rotating the fixed crank 12 in either direction will rotate the gear - wheel 18 in the same direction thereby also rotating the gear-wheel 15 in the same direction, and thus rotating the balance wheel 19 in the opposite direction. This operation of the driving-shaft rotates the driven shaft 4 first in one direction and then in the other by the meshing engagement of the pinion 11 first with the upper face of the rack 31 and then with the lower face thereof in a well understood manner thereby sliding the rock-cylinder first to its lower and then to its upper limit, the engagement of the roller 22 with the longitudinal recess 32 preventing any rotary movement of the rack-cylinder. In the sliding movements of the rack-cylinder the roller 10 is guided, as usual, first down one track 26 and up the other track 27.

The balance wheel gearing is preferably so arranged that the balance wheel will make three and one-third revolutions to one of the driving shaft, thereby materially increasing its momentum and thereby aiding the operator in overcoming any obstruction to the revolution of the driven shaft in use, as well as materially lightening the labor of operating the same.

Having thus described my invention and the manner of employing the same what I desire to secure by Letters Patent is:

1. In a washing machine mechanism, an upright supporting frame having a fixed or integral stud-shaft upon the outer end thereof; a driven shaft rotatably mounted in the frame in vertical arrangement; a two-part non-rotatable rack cylinder slidably mounted on the said shaft; a revoluble driving shaft mounted in the frame in horizontal arrangement; a rigid pinion on the driving shaft adapted for a meshing engagement with the said rack-cylinder; an actuating crank fixed on the outer end of the driving-shaft; a balance wheel loosely mounted on the driving shaft adjacent to the said crank; a bevel gear on the inner end of the balance-wheel hub; a bevel gear wheel loosely mounted on the stud-shaft in mesh with the said hub-gear; and a gear wheel fixed on the driving-shaft in mesh with the said bevel gear wheel.

2. The combination in a washing machine mechanism of an upright supporting frame having a rigid stud-shaft upon its outer end; a vertical driven shaft; reversing means slidably mounted on the driven shaft; a rigid pinion on the inner end of the driving shaft adapted for an actuating engagement with the said reversing means; means for actuating the driving shaft; a balance wheel loosely mounted on the outer end of the driving shaft, and having a bevel gear upon the inner end of its hub; a bevel gear wheel loosely mounted on the said stud-shaft and adapted for a meshing engagement with the hub-gear; and a gear wheel fixed on the driving-shaft in mesh with the bevel gear wheel, whereby the balance wheel is given a greater speed than that of the driving shaft.

3. In a washing machine mechanism a supporting frame having an oblique stud-shaft near its outer end; a horizontal driving-shaft revolubly mounted in the frame; a fixed pinion on the inner end of the driving shaft; a vertical driven shaft; reversing means slidably mounted on the driven shaft; means for actuating the driving shaft; a balance wheel loosely mounted on the outer end of the driving shaft; and means for imparting to the balance wheel a greater speed than that of the driving shaft consisting of means for gearing the said balance wheel to the driving shaft on which it is mounted, substantially as described.

4. In a gearing for washing machines a driving-shaft; a fly wheel revolubly mounted on the driving-shaft and having a beveled gear upon its inner face; a fixed operating handle on the outer end of the driving shaft;

a pinion fixed upon the inner end of the driving shaft; a beveled gear fixed upon the driving shaft; a driving connection between the said gear and the fly-wheel; a driven shaft; and a reversing mechanism mounted on the driven shaft in operative engagement with the said pinion.

Signed by me at Fort Wayne, Allen county. State of Indiana, this 31st day of October, A. D. 1907.

WARREN SWEET.

Witnesses:
AUGUSTA VIBERG,
WATTS P. DENNY.